United States Patent

[11] 3,624,498

| [72] | Inventors | Charles Edward Smith<br>126 Selma Blvd. RD #2, Dover, N.J. 07801;<br>Gennaro Joseph Vollero, 12 Sycamore St., Bloomfield, N.J. 07003 |
|---|---|---|
| [21] | Appl. No. | 856,421 |
| [22] | Filed | Sept. 9, 1969 |
| [45] | Patented | Nov. 30, 1971 |

[54] SHOCKPROOF EXTENSION BOX INCLUDING POLARITY TESTING MEANS
6 Claims, 2 Drawing Figs.

[52] U.S. Cl. .................................................. 324/51, 324/133
[51] Int. Cl. .................................................. G01r 31/04
[50] Field of Search ........................................... 324/51, 133

[56] References Cited
UNITED STATES PATENTS

| 2,806,993 | 9/1957 | Matousek .................. | 324/51 |
| 2,994,819 | 8/1961 | Vincent ..................... | 324/51 |
| 3,141,128 | 7/1964 | Behr ......................... | 324/51 |
| 3,368,146 | 2/1968 | Regan et al. ............... | 324/51 |

FOREIGN PATENTS

| 807,544 | 1/1959 | Great Britain ................ | 324/51 |

*Primary Examiner*—Gerard R. Strecker
*Attorney*—Larson, Taylor & Hinds

ABSTRACT: A shockproof extension box providing plural outlets includes an insulated terminal screw connected to the neutral lead of the input cable through a first light and a probe connected to the neutral lead through a second light. A switch disconnects the positive input lead for the first testing step wherein the input cable is plugged into a wall outlet and the finger of the operator is used to contact the terminal screw. If under these circumstances the first light lights up the inlet plug should be reversed. In a second testing step, the switch is closed so that the extension box outlets are energized and a piece of equipment is plugged into one of the box outlets. The probe is then brought into contact with the equipment and if the second light lights up the equipment plug is reversed. If the second light lights up for both plug positions the equipment should not be used.

PATENTED NOV 30 1971                    3,624,498

INVENTORS
CHARLES E. SMITH
GENNARO J. VOLLERO

BY *Larson and Taylor*

ATTORNEYS ously preferred, the invention is not limited thereto, but is susceptible of numerous changes and modifications as known to those skilled in the art. Therefore, I do not wish to be limited to the details shown and described herein but intend to cover all such changes and modifications as are encompassed by the scope of the appended claims.

3,624,498

SHOCKPROOF EXTENSION BOX INCLUDING POLARITY TESTING MEANS

FIELD OF THE INVENTION

The present invention relates to extension boxes used in providing a plurality of outlets for powering electrical equipment such as electrical musical instruments and more particularly to an extension box of the type described which may be tested by a user to ensure that both the connections between the box and the power inlet to the box and between the box and the equipment connected to the box are of proper polarities.

BACKGROUND OF THE INVENTION

The increased use of electricity in many relatively new fields such as music and medicine has presented new safety problems. For example, a significant number of performers have been injured or killed by shocks received from their instruments. Further, patients have been injured in hospitals utilizing electrical treatment equipment which has been developed. A large number of these injuries could have been prevented if the equipment used was properly grounded. Although various arrangements have been devised for ensuring proper equipment grounding these arrangements generally suffer from one or more serious disadvantages. Among these disadvantages are that the prohibitive expense of many arrangements, the complexity of the mechanical and electrical systems used and the consequent high maintenance costs associated with complex systems, and the difficulties presented in using the arrangements, some of which may only be used by skilled operators. On the other hand, many relatively simple devices are simply not effective.

SUMMARY OF THE INVENTION

In accordance with the invention an extension box is provided which overcomes the problems of the prior art. The extension box of the invention while being relatively simple in construction, inexpensive and easy to use, is reliable and effective. In general, the extension box of the present invention ensures both that the relative polarities of the box outlets are correct and that the equipment connected to these outlets is connected with the proper polarity. By ensuring both that the extension box outlets are correctly polarized and that the equipment plugged into the outlets is properly polarized, the shock hazards normally associated with electrical equipment are substantially reduced.

In accordance with a presently preferred embodiment of the invention, an extension box is provided which includes an insulated terminal screw connected to the neutral lead of the input cable to the extension box through a first light and an insulated probe connected to the neutral lead through a second light. A switch connected in series with positive lead provides deenergization of the extension box during a first testing step wherein the connector plug of the input cable is plugged into a suitable outlet such as a conventional AC wall outlet and the operator touches the terminal screw with his finger. If the first light is lit up the plug is reversed in its orientation in the outlet. This step ensures that the extension box outlets are properly polarized and will provide proper relative polarization of these outlets even where the wall outlet is improperly wired so that the "hot" and "cold" terminals are reversed. With the first step completed, the switch is closed and the extension box outlets energized the first light being disabled at this time. A piece of equipment to be powered from the extension box is then plugged into an outlet and the probe is brought into contact therewith. If the second light is lit up the equipment plug is reversed. If the second light does not light up, then it is ensured that the entire system is correctly polarized. It is noted that if the second light is lit up for both orientations of the equipment plug this is an indication that the piece of equipment is itself defective.

Other features and advantages of the invention will be set forth in or apparent from the detailed description of a presently preferred embodiment thereof found hereinbelow.

DESCRIPTION OF A PREFERRED EMBODIMENT

Figure 1:
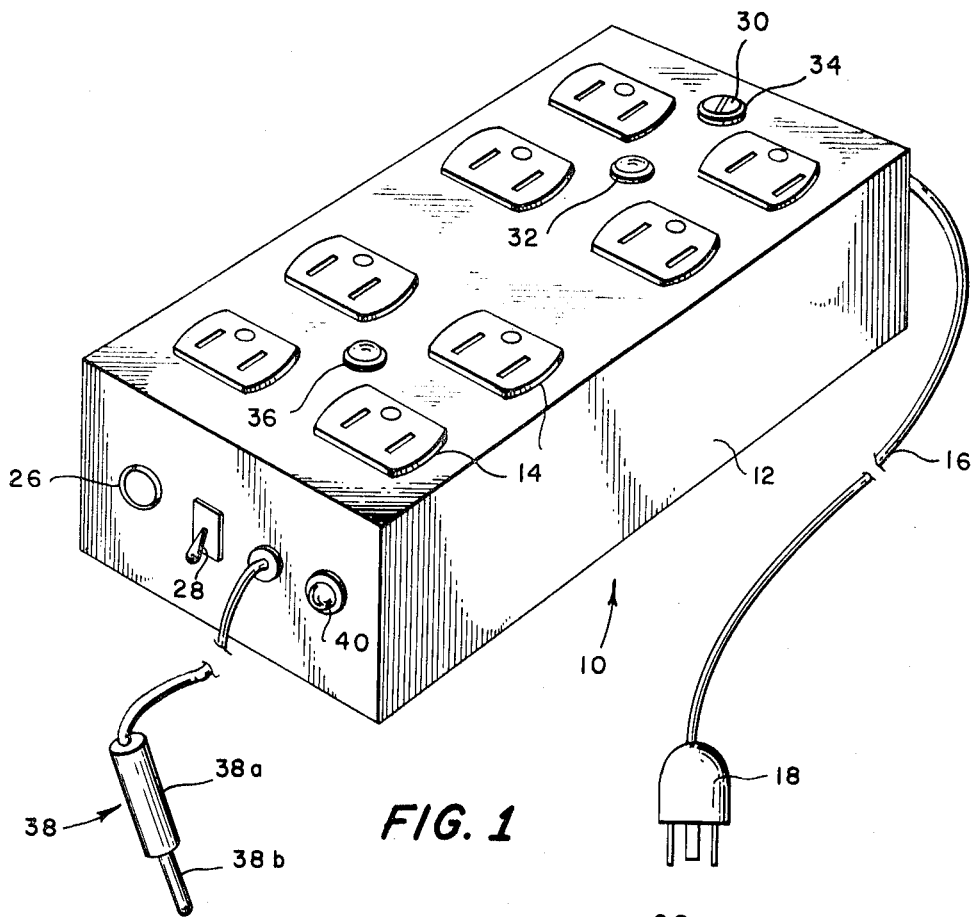
FIG. 1 is a perspective view of a presently preferred embodiment of the invention.

Referring to FIG. 1, an extension box 10 in accordance with a presently preferred embodiment of the invention includes a generally rectangular housing 12 having a plurality of outlet receptacles 14 located in the upper surface thereof. Although, as shown in FIG. 1, housing 12 includes eight receptacles 14 arranged in groups of four it will be understood that the number and arrangement of the receptacles is a matter of design.

Figure 2:
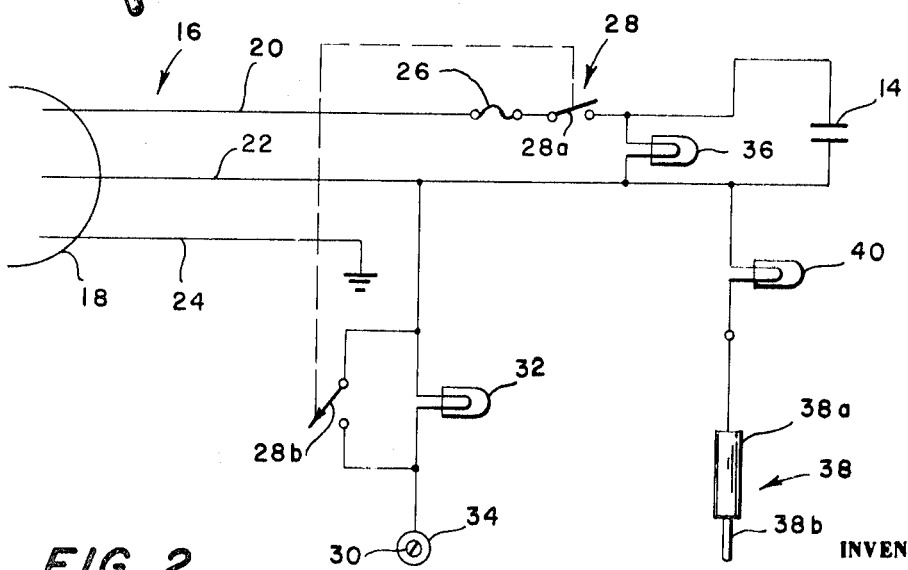
FIG. 2 is a schematic circuit diagram of the electrical circuitry for the embodiment of FIG. 1.

Considering FIGS. 1 and 2 together, receptacles 14 (one of which is indicated schematically in FIG. 2) are adapted to be energized through a conventional three-conductor cord 16 which terminates in a standard plug 18. Cord 16 includes a positive or hot conductor 20, a neutral or cold conductor 22, and a ground conductor 24. As shown in FIG. 1, hot conductor or lead 20 is connected through a fuse 26 and a switch 28 to one side of receptacle 14 while cold conductor or lead 22 is connected to the other side of receptacle 14. A metallic terminal screw 30 extending upwardly of the upper surface of housing 12 is connected to cold lead 22 through a first light 32. Terminal screw 30 is insulated from housing 12 by an annular insulating sleeve 34 constructed of plastic or the like. As indicated in FIG. 2 contact 28a of switch 28 is mechanically interlocked with a shorting contact 28b which, when actuated, short circuits light 32. A second light 36 is connected between hot lead 20 and cold lead 22 beyond switch contact 28a and a probe 38 is connected to cold lead 22 through a third light 40. Probe 38 includes an insulating sleeve 38a and a probe tip 38b which extends outwardly beyond sleeve 38a.

In operation, with switch 28 deactuated and contacts 28a and 28b open and no equipment plugged into receptacles 14, plug 18 is plugged into a conventional AC outlet receptacle (not shown) such as a wall socket or the like. The operator then touches metallic terminal screw 30 with his finger. If light 32 lights up an indication is provided that plug 18 is oriented incorrectly in the wall receptacle, the lighting of light 32 indicating that the cold lead 22 of cord 16 is connected to the hot or live terminal of the wall receptacle. The orientation of plug 18 is then reversed so that a proper connection between the plug 18 and wall receptacle is provided. After the completion of this first step in the testing operation, the extension box 10 is "zeroed," that is, the first step ensures that the polarities of the receptacles 14 are correct. It is noted that the receptacles 14 will be properly polarized regardless of the polarity of the wall outlet in that even where the wall outlet is improperly wired so that the polarity thereof is reversed from what would be expected, after the testing step outlined above, the polarity of the receptacles 14 relative to the outlet will necessarily be such that hot conductor 20 is connected to the live outlet terminal and the cold conductor 22 is connected to the cold output terminal.

In the next step, switch 18 is actuated which causes closing of contacts 28a and, consequently, the energization of outlets 14. Interlocked contact 28b will also be closed to effect shorting out of light 32. It is noted that light 32 is disabled in this way to prevent lighting thereof during the second testing stage to avoid confusion. On the other hand, light 36, connected between conductors 20 and 22, should be lit at this time to thus indicate that receptacles 14 are energized. With switch 28 actuated, testing of the connections between the equipment to be energized and the receptacles 14 may be initiated. This testing is accomplished by merely plugging an item of equipment into a receptacle 14 and touching probe tip 38b to the equipment. If light 40 lights then the plug should be reversed. To explain, referring to FIG. 2, the lighting of light 40 is an indication that probe 38 is connected to the high potential side of the equipment circuit rather than the ground side. If the orientation of the plug is reversed light 40 should not light up.

It is noted that if light 40 lights up for both orientations of the equipment plug this is an indication that the equipment itself is faulty. For example, where an item of equipment is not properly grounded light 40 may light up for either orientation of the plug in a receptacle 14.

Each item of equipment plugged into a receptacle 14 should be tested in this way, this is, the probe tip 38b should be used to contact the equipment housing to see whether light 32 lights up. As stated, if light 40 lights up for both orientations of the equipment plug the item of equipment should not be used.

Although the use of lights as indicators is presently preferred because of the relatively long lifetimes and low current operating capabilities thereof other indicators such as buzzers and the like may also be used.

Although the invention has been described in detail with respect to an exemplary embodiment thereof, it will be understood by those of ordinary skill in the art that other variations and modifications may be effected within the scope and spirit of the invention.

We claim:

1. A method of providing shockproof connections between an electrical extension box having at least one output receptacle and an item of equipment connected to said at least one receptacle comprising the steps of first, testing the polarity of said at least one receptacle relative to the input connection thereto from an external source of electrical energy to ensure that said at least one receptacle is correctly polarized and second, testing the polarity of the connection between said at least one receptacle and the item of equipment to ensure that this connection is correctly polarized, said first step comprising connecting the input cable to the extension box into an outlet, breaking the connection between the positive lead of the input cable and said at least one receptacle, touching by the tester of a screw connected to the neutral lead of the input cable and observing whether an indicator connected in series between said neutral lead and said screw is actuated and said second step comprising energizing said at least one receptacle, connecting an item of equipment into said at least one receptacle, bringing a probe connected to the said neutral lead of said input cable into contact with the item of equipment and observing whether an indicator connected in series between said neutral lead and said probe is actuated.

2. A method as claimed in claim 1 wherein said indicators comprise lights said second step includes disconnecting the first-mentioned indicator.

3. A shockproof electrical extension box comprising at least one outlet receptacle adapted to be connected to the input of an item of electrical equipment, an inlet connector adapted to be connected to a source of electrical energy to provide energization of said at least one receptacle, a switch for, in the actuated state thereof, connecting said at least one receptacle and said inlet connector, and for, in the deactuated state thereof, disconnecting said at least one receptacle and said inlet connector, first testing means for, when said switch is deactuated, testing the polarity of the connection between said inlet connector and said source to ensure that said at least one receptacle is properly polarized, and second testing means for, when said switch is actuated, testing the polarity of the connection between said at least one receptacle and the input of the item of equipment, said inlet connector including a positive lead and a neutral lead, said first testing means comprising a first light and a terminal screw connected to the neutral lead of said inlet connector through said first light, and said second testing means comprising a second light and a probe connected to the neutral lead of said inlet connector through said second light.

4. An extension box as claimed in claim 3 further comprising a third light connected between the neutral and positive leads of said inlet connector beyond said switch and a second switch connected in shunt with said first light, the first-mentioned switch being connected in series in said positive lead and being mechanically interlocked with said second switch.

5. An extension box as claimed in claim 2 wherein said box comprises a generally rectangular housing and said terminal screw extends through the upper surface of said housing, said extension box further comprising an annular insulating element for insulating said screw from said housing.

6. An extension box as claimed in claim 5 further comprising a fuse connected in series with said positive lead, said fuse being accessible from the front end of said housing, said switches including an actuator located at front end and said probe extending outwardly of said front end.

* * * * *